United States Patent
Yano

(10) Patent No.: US 11,999,292 B2
(45) Date of Patent: Jun. 4, 2024

(54) VEHICLE CABIN LIGHTING SYSTEM

(71) Applicant: SUBARU CORPORATION, Tokyo (JP)

(72) Inventor: Masato Yano, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 70 days.

(21) Appl. No.: 17/687,152

(22) Filed: Mar. 4, 2022

(65) Prior Publication Data
US 2022/0305987 A1     Sep. 29, 2022

(30) Foreign Application Priority Data

Mar. 26, 2021 (JP) .................................. 2021-053333

(51) Int. Cl.
| | | |
|---|---|---|
| *B60Q 3/85* | (2017.01) | |
| *B60L 1/14* | (2006.01) | |
| *H02J 50/10* | (2016.01) | |

(52) U.S. Cl.
CPC .................. *B60Q 3/85* (2017.02); *B60L 1/14* (2013.01); *H02J 50/10* (2016.02); *B60Q 2900/30* (2013.01); *H02J 2310/40* (2020.01)

(58) Field of Classification Search
CPC ........ B60Q 3/85; B60Q 2900/30; B60Q 3/80; B60Q 3/225; B60L 1/14; H02J 50/10; H02J 2310/40; H02J 7/02
See application file for complete search history.

(56) References Cited

U.S. PATENT DOCUMENTS

| | | | | |
|---|---|---|---|---|
| 2017/0313248 A1* | 11/2017 | Kothari | ................... | H04N 23/69 |
| 2020/0408875 A1* | 12/2020 | Mai | ......................... | G01S 7/006 |
| 2022/0019095 A1* | 1/2022 | Tanaka | ........................ | B60J 3/04 |

FOREIGN PATENT DOCUMENTS

| | | | |
|---|---|---|---|
| DE | 102019206190 B3 * | 8/2020 | |
| JP | H09-30292 A | 2/1997 | |
| WO | WO-2019213209 A1 * | 11/2019 | ............... B32B 3/30 |

* cited by examiner

*Primary Examiner* — Abdullah A Riyami
*Assistant Examiner* — Syed M Kaiser
(74) *Attorney, Agent, or Firm* — MCGINN I.P. LAW GROUP, PLLC

(57) ABSTRACT

A vehicle cabin lighting system includes a lighting device, a lighting control device, and a wireless charger. The lighting device is configured to illuminate a placement area in which an article is to be placed. The lighting control device is configured to control brightness of the lighting device. The wireless charger is configured to charge, in a non-contact manner, a mobile terminal placed in the placement area. The lighting control device is configured to execute, in response to detecting that the mobile terminal is placed in the placement area based on an operation of the wireless charger, a control by which the lighting device is turned off or dimmed.

20 Claims, 4 Drawing Sheets

VEHICLE CABIN LIGHTING SYSTEM

CROSS-REFERENCE TO RELATED APPLICATIONS

The present application claims priority from Japanese Patent Application No. 2021-053333 filed on Mar. 26, 2021, the entire contents of which are hereby incorporated by reference.

BACKGROUND

The disclosure relates to a vehicle cabin lighting system that reduces an amount of light that enters a driver's field of vision.

Inside an automobile, there is a placement area such as a pocket or a tray, where various articles can be placed.

SUMMARY

An aspect of the disclosure provides a vehicle cabin lighting system to be applied to a vehicle. The vehicle cabin lighting system includes a lighting device, a lighting control device, and a wireless charger. The lighting device is configured to illuminate a placement area in an article is to be placed. The lighting control device is configured to control brightness of the lighting device. The wireless charger is configured to charge, in a non-contact manner, a mobile terminal placed in the placement area. The lighting control device is configured to execute, in response to detecting that the mobile terminal is placed in the placement area based on an operation of the wireless charger, a control by which the lighting device is turned off or dimmed.

An aspect of the disclosure provides a vehicle cabin lighting system to be applied to a vehicle. The vehicle cabin lighting system includes a lighting device, circuitry, and a wireless charger. The lighting device includes a light source and is configured to illuminate a placement area in which an article is to be placed. The circuitry is configured to control brightness of the lighting device. The wireless charger is configured to charge, in a non-contact manner, a mobile terminal placed in the placement area. The circuitry is configured to execute, in response to detecting that the mobile terminal is placed in the placement area based on an operation of the wireless charger, a control by which the lighting device is turned off or dimmed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Japanese Unexamined Patent Application Publication No (JP-A). H9-30292 describes a front console of a vehicle. This front console has a substantially flat lower portion, which is formed as a pocket in which an article is to be placed. It has turned out that when a mobile terminal such as a smartphone is placed in the pocket with a display screen facing up, light from the above is reflected off the display screen, giving a driver a sense of discomfort. Such a state is more likely to occur when the placement area is located in the lower portion of the front console but may occur when the placement area is located in an upper portion of the front console or at other places.

Figure 1:
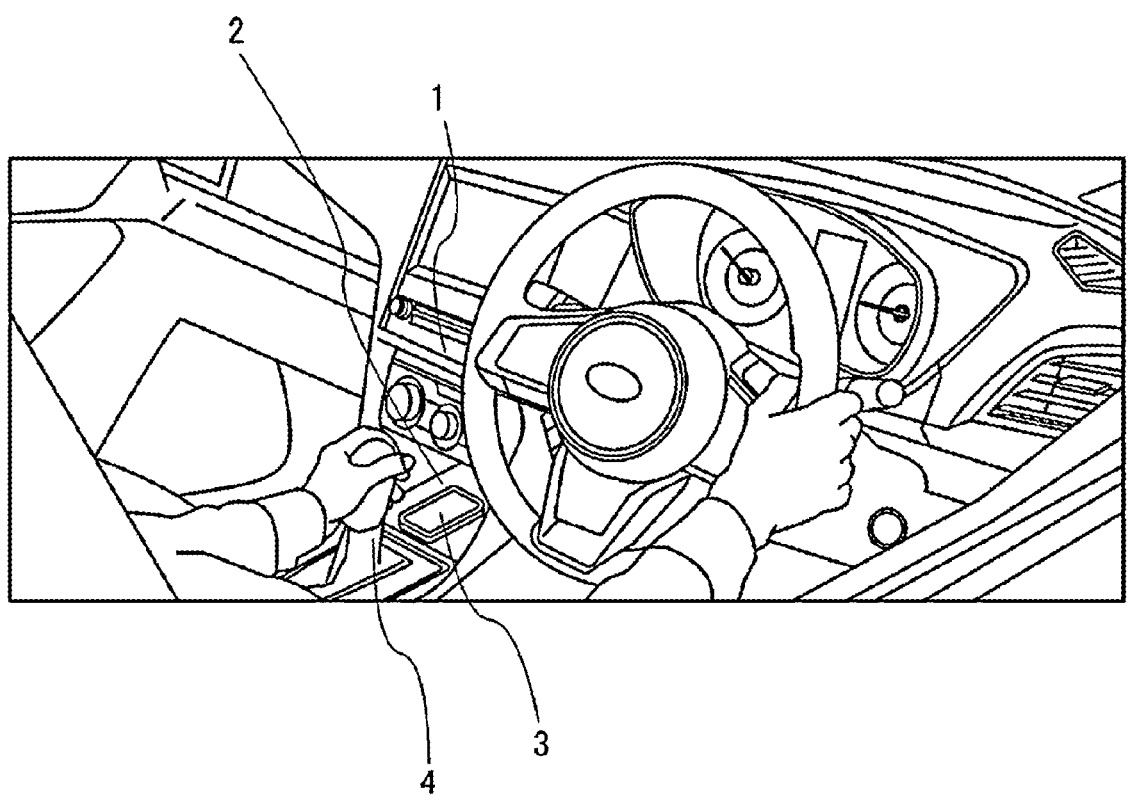
FIG. 1 is a diagram illustrating a front console (center console) having a pocket.

FIG. 1 illustrates an interior of a front portion of a vehicle, which is substantially the same as the one described in JP-A No. H9-30292. Referring to FIG. 1, a pocket 2, which is a placement area, is provided in a lower portion of a front console 1. An article can be placed in the pocket 2. The pocket 2 can be equipped with a lighting device at an upper area thereof. In response to position lights or headlights being turned on at nighttime or the like, the lighting device turns on to illuminate the inside of the pocket 2 from the above. The light from the lighting device does not directly enter eyes of a driver D. The light is reflected inside the pocket 2 and indirectly enters the eyes of the driver D. This indirect light has the substantially the same atmospheric brightness as light emitted by illumination lights of an air-conditioner control panel, a speedometer, and the like concurrently with the lighting device of the pocket 2. The lighting device also makes it easier to check whether an article is placed in the pocket 2.

A mobile terminal such as a smartphone 3 can be placed in such a placement area as illustrated in FIG. 1. When being charged wirelessly, the mobile terminal is commonly placed with a display screen facing up. When the lighting device is turned on with the smartphone 3 being placed in the pocket 2, illuminating light L is reflected off the display screen of the smartphone 3. It has turned out that reflected light RL that is brighter than the indirect light enters in the field of vision and may give the driver D a sense of discomfort. Such a state is more likely to occur when the placement area is located in the lower portion of the front console but may occur when the placement area is located in an upper portion of the front console or at other places.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

A vehicle cabin lighting system according to a first embodiment includes a lighting device (a light-emitting diode (LED) light 5) provided in a vehicle cabin, a lighting control device 51 that controls brightness of the lighting device, and a wireless charger 6 capable of charging, in a non-contact manner, a mobile terminal (the smartphone 3) placed in a lighting range of the lighting device.

Figure 2:
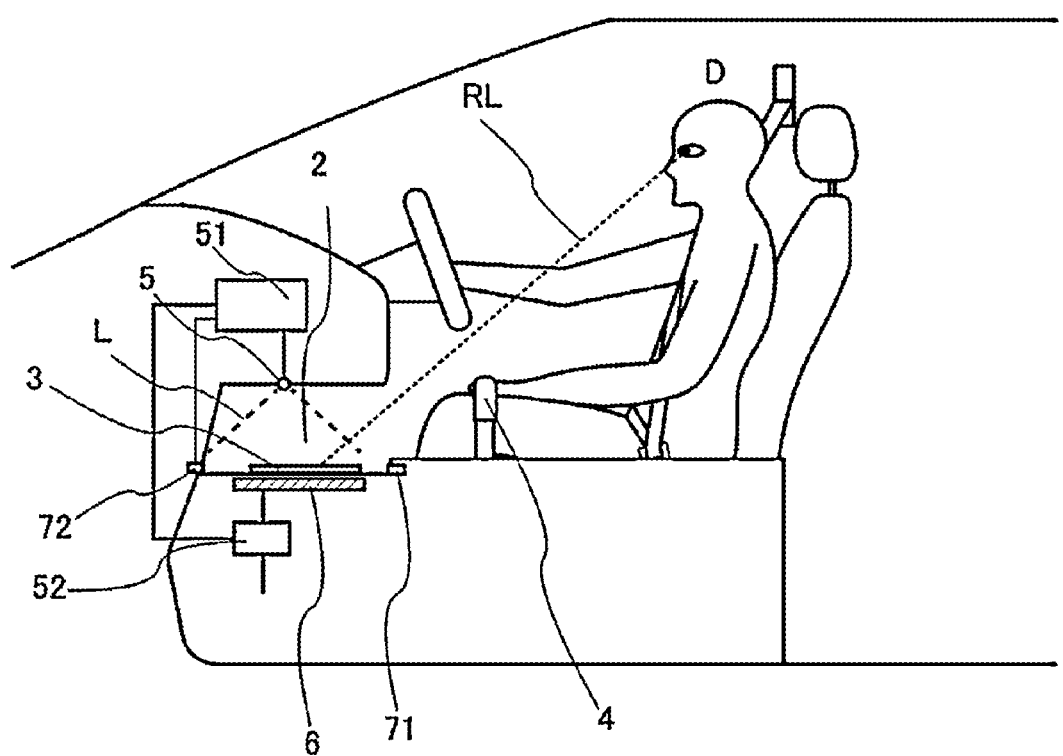
FIG. 2 is a sectional view of a front portion of a vehicle according to an embodiment.

FIG. 2 illustrates a state in which the smartphone 3 (mobile terminal) is placed in a vehicle equipped with the vehicle cabin lighting system according to the first embodiment, as a longitudinal section in a front-rear direction of the vehicle cabin. The pocket 2 is in front of a shift knob 4 and under an air-conditioner operation panel (not illustrated). The pocket 2 is equipped with the LED light 5, which is a lighting device, at an upper area thereof. The LED light 5 illuminates the inside of the pocket 2. The illuminating light L is reflected inside the pocket 2 and enters the eyes of the driver D as indirect light. The lighting control device 51 controls the brightness of the LED light 5. The lighting control device 51 includes a central processing unit (CPU) and a memory, and is coupled to various detectors or the like via corresponding interfaces. The smartphone 3 can be placed in the pocket 2. In the first embodiment, the pocket 2 is equipped with the wireless charger 6 thereunder. The wireless charger 6 is capable of charging, in a non-contact manner, the smartphone 3 placed in the pocket 2 that is the lighting range of the illuminating light L emitted by the LED light 5. The smartphone 3 is a mobile terminal having a display screen. The pocket 2 is also equipped with an infrared LED 71 and a light-receiving element 72. An output of the light-receiving element 72 is input to the lighting control device 51. When an article is placed in the pocket 2, infrared rays emitted from the infrared LED 71 are blocked by the article and do not reach the light-receiving element 72. Thus, the lighting control device 51 is able to detect placement of the article in the pocket 2.

In response to position lights or headlights being turned on while the vehicle is traveling at nighttime, the LED light 5 turns on together with other illumination lights in the vehicle cabin. When the LED light 5 turns on, the illuminating light L illuminates the inside of the pocket 2 to make it easier for the driver D to check whether there is an article. The illuminating light L also becomes low-brightness indirect light together with the light from the other illumination lights to improve the atmosphere in the vehicle. However, if the smartphone 3 is placed in the pocket 2 with the display screen facing up, the illuminating light L emitted by the LED light 5 is reflected off the display screen of the smartphone 3. Consequently, the reflected light RL that is stronger than ordinary indirect light enters the eyes of the driver D to unfavorably give the driver D a sense of discomfort. Accordingly, when the smartphone 3 is placed in the lighting range of the LED light 5, the lighting control device 51 further dims the LED light 5 to make the reflected light RL weaker.

In the first embodiment, the lighting control device 51 uses the wireless charger 6. For example, in response to the start of wireless charging, the lighting control device 51 dims the LED light 5. The lighting control device 51 keeps the dim state until the light-receiving element 72 receives infrared rays emitted from the infrared LED 71. In response to the light-receiving element 72 receiving infrared rays, the lighting control device 51 stops dimming the LED light 5. In the first embodiment, the lighting range of the LED light 5 in the pocket 2 in which the reflected light RL enters the field of vision of the driver D to give the driver D a sense of discomfort is a wirelessly chargeable range. A power detector 52 is attached to a power supply of the wireless charger 6 and detects power consumption. When the smartphone 3 is placed in the pocket 2 and is charged by the wireless charger 6, the power consumption increases. Thus, placement of the smartphone 3 can be detected. Information on detection of the smartphone 3 obtained by the power detector 52 is sent to the lighting control device 51.

Figure 3:
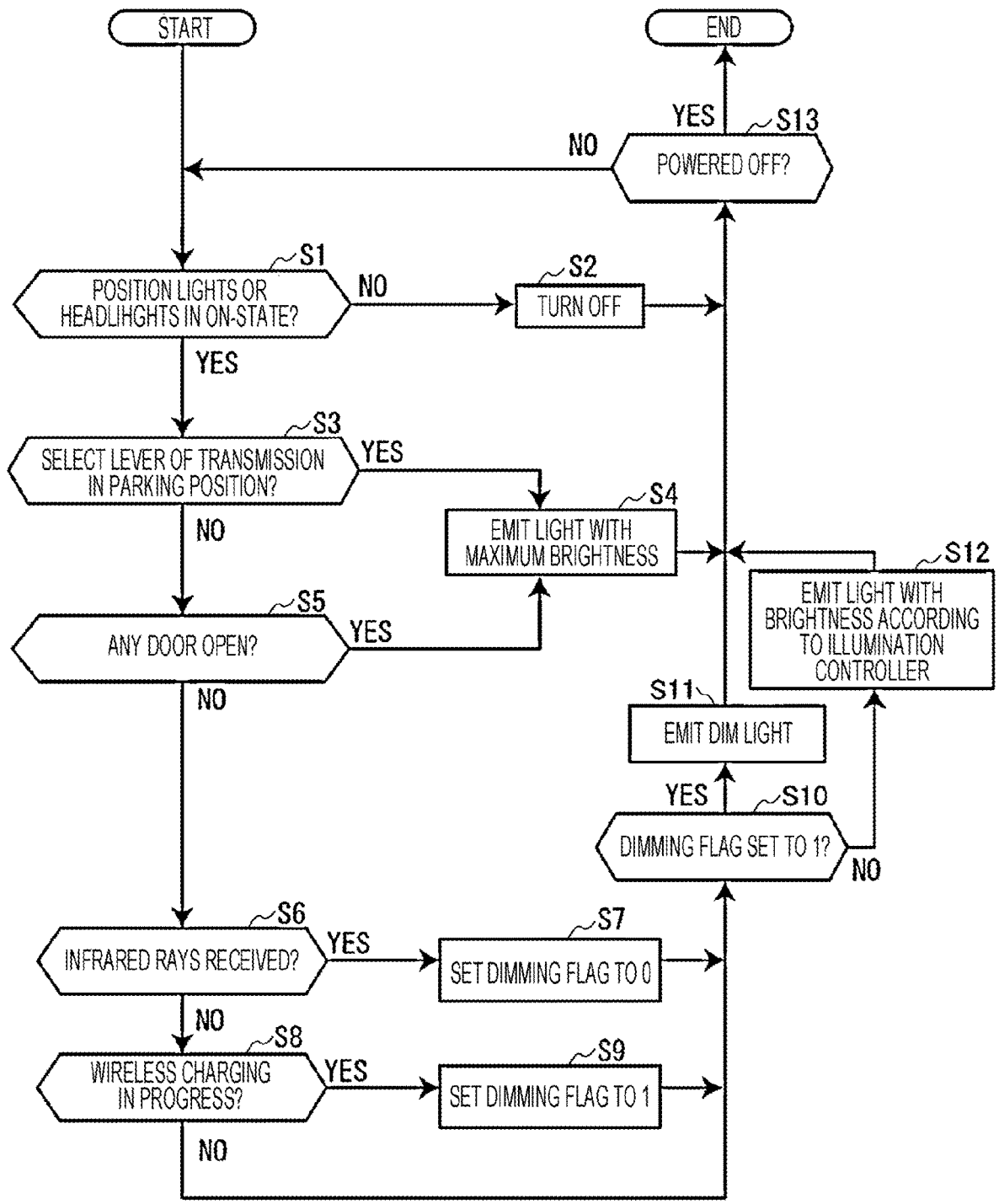
FIG. 3 is a flowchart according to the embodiment.

FIG. 3 is a flowchart of a process for controlling light emission of the LED light 5 performed by the lighting control device 51 in the first embodiment. This control process is performed as a result of the CPU of the lighting control device 51 executing a program stored in the memory. The CPU is coupled, via corresponding interfaces, to the position lights, the headlights, a door opening-closing detecting device (not illustrated) that detects opening and closing of each door, and the power detector 52.

The flowchart starts in response to power-on of the vehicle. The lighting control device 51 determines whether at least one of the position lights or the headlights are in an on-state (step S1). If neither the position lights nor the headlights are in the on-state, the lighting control device 51 turns off the LED light 5 (step S2). If at least one of the position lights or the headlights are in the on-state, the lighting control device 51 determines whether the select lever for transmission is in the parking position (step S3). If the select lever for transmission is in the parking position, the lighting control device 51 controls the LED light 5 to emit light with maximum brightness (step S4). This makes it easier for the driver D to check the position of the smartphone 3 while the vehicle is stationary. If the select lever for transmission is not in the parking position, the lighting control device 51 determines whether any of the doors is open by using the door opening-closing detecting device (step S5). If any of the doors is open, the lighting control device 51 also controls the LED light 5 to emit light with the maximum brightness (step S4). Consequently, the inside of the pocket 2 is illuminated with the maximum brightness. Thus, a probability of a person such as the driver D leaving the smartphone 3 or the like behind in the pocket 2 reduces when the person opens the door to get out of the vehicle.

If no doors are open, the lighting control device 51 determines whether infrared rays are received by the light-receiving element 72 (step S6). If infrared rays are received, the lighting control device 51 sets a dimming flag to 0 (step S7). When the smartphone 3 is not placed in the pocket 2, infrared rays are received. When the smartphone 3 is placed in the pocket 2, infrared rays emitted by the infrared LED 71 are blocked by the smartphone 3. Thus, the light-receiving element 72 does not receive the infrared rays. If infrared rays are not received in step S6, the lighting control device 51 determines whether wireless charging is being performed (step S8). If wireless charging is being performed, the lighting control device 51 sets the dimming flag to 1 (step S9). If wireless charging is not being performed, the lighting control device 51 determines whether the dimming flag is set to 1 (step S10). The lighting control device 51 determines whether the dimming flag is set to 1 in step S10 also after steps S7 and S9. If the dimming flag is set to 1, the lighting control device 51 controls the LED light 5 to emit dim light (step S11). If the dimming flag is not set to 1, the lighting control device 51 controls the LED light 5 to emit light with brightness according to an illumination controller to provide indirect lighting (step S12). The illumination controller is a controller that controls the brightness of a speedometer and the like, and is capable of adjusting the brightness on the basis of the brightness outside the vehicle, the time, or the like. The brightness can also be manually adjusted by the driver D. After steps S2, S4, S11, and S12, the lighting control device 51 determines whether the vehicle is powered off (step S13). If the vehicle is not powered off, the process returns again to step S1 and the lighting control device 51 repeats the process. If the vehicle is powered off, the light controlling device 51 ends the process.

When the smartphone 3 is placed in the pocket 2, the smartphone 3 blocks infrared rays emitted by the infrared LED 71 and is wirelessly charged. Thus, the process proceeds sequentially to steps S6, S8, and S9, in which the dimming flag is set to 1. The process then proceeds sequentially to steps S10 and S11, in which the LED light 5 emits dim light. Even after wireless charging ends, the dimming flag is not changed unless the light-receiving element 72 senses infrared rays as a result of the smartphone 3 being lifted. In addition, even when the LED light 5 temporarily emits light with the maximum brightness in response to opening of a door, the dimming flag is not changed. Thus, if it is determined in step S10 that the dimming flag is set to 1, the LED light 5 emits dim light in step S11. When the light-receiving element 72 senses infrared rays as a result of the smartphone 3 being lifted, the process proceeds from steps S6 to S7, in which the dimming flag is set to 0. The process then proceeds sequentially to steps S10 to S12, in which the LED light 5 emits light with brightness according to the illumination controller.

In this manner, when the smartphone 3 is placed in the pocket 2, the LED light 5 is caused to emit light with reduced brightness. Consequently, the reflected light RL from the smartphone 3 becomes dim. Thus, a possibility of the reflected light RL giving the driver D a sense of discomfort is reduced.

If a shift state detector (not illustrated) detects that the select lever for transmission is in a parking state in step S3, the lighting control device 51 does not dim the LED light 5 even when the smartphone 3 is charged by the wireless charger 6. In the first embodiment, the LED light 5 emits light with the maximum brightness in this case. Alternatively, the LED light 5 may emit light with an intensity for ordinary indirect light by emitting light with the brightness according to the illumination controller as in step S12. The same applies to the case where opening of the door is detected in step S5.

In the first embodiment, the LED light 5 is caused to emit light with reduced brightness in step S11. Alternatively, the LED light 5 may be turned off in step S11. The vehicle cabin lighting system may further include a vehicle state detector (not illustrated) that detects a state of the vehicle such as a traveling speed, and a traveling state determiner (not illustrated) that infers the traveling state such as the vehicle being traveling, on the basis of a detection result obtained by the vehicle state detector. If the traveling state determiner determines that the vehicle is not traveling, the lighting control device 51 may skip turning off or dimming the LED light 5 even when the smartphone 3 is detected based on the operation of the wireless charger 6. Such a configuration makes it easier to recognize the smartphone 3 because the LED light 5 is neither turned off nor dimmed when the vehicle is stationary.

Second Embodiment

Figure 4:
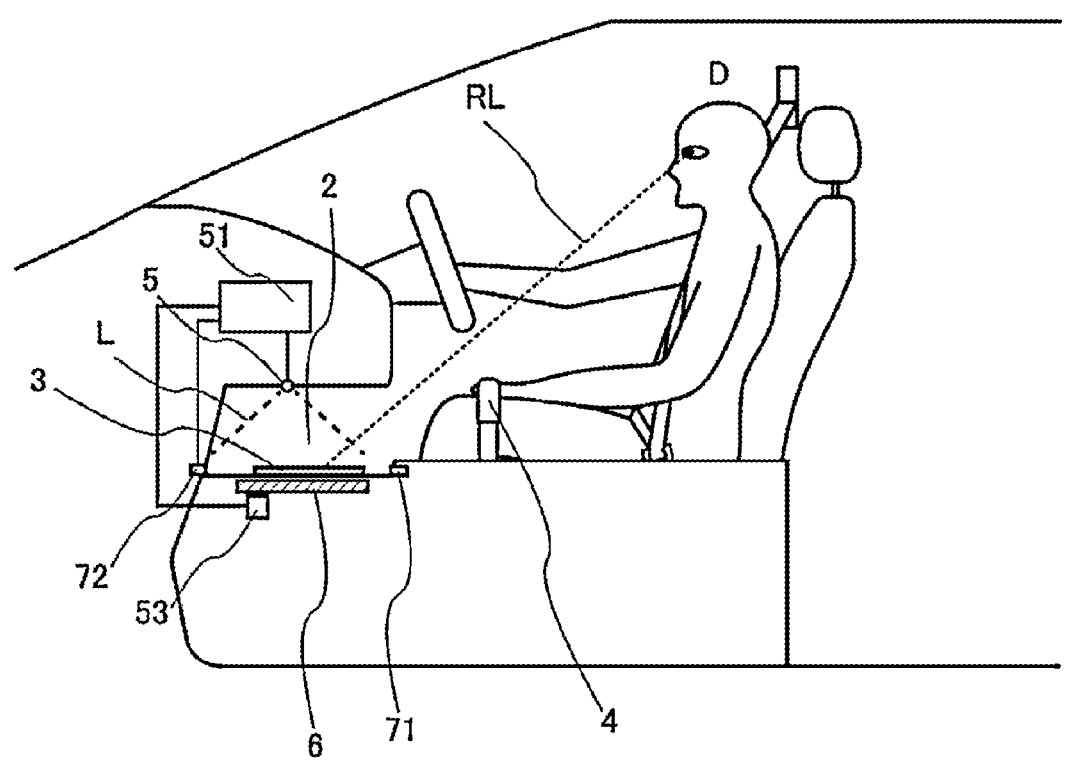
FIG. 4 is a sectional view of a front portion of a vehicle according to an embodiment.

FIG. 4 illustrates a vehicle cabin lighting system according to a second embodiment. In the second embodiment, a wireless power supply detector 53 is provided in the vicinity of the wireless charger 6. The wireless power supply detector 53 includes a coil or the like. The wireless power supply detector 53 detects a change in electromagnetic field emitted from the wireless charger 6, as a voltage generated by the coil, and informs the lighting control device 51 that wireless charging is being performed. A coil not to be detected by a foreign object detection function (FOD) is used as the coil. In the second embodiment, the wireless power supply detector 53 is used as a device that determines whether wireless charging is performed in step S8 in the flowchart of FIG. 3.

Third Embodiment

In a vehicle cabin lighting system according to a third embodiment, a Qi packet detector (not illustrated) is used instead of the wireless power supply detector 53 illustrated in FIG. 4 according to the second embodiment. The infrared LED 71 and the light-receiving element 72 are not used. The Qi packet detector captures a Qi packet communicated between the wireless charger 6 and the smartphone 3 to monitor the operation of the wireless charger 6. In response to determining, through analysis of the Qi packet, that the smartphone 3 is detected by the wireless charger 6, the Qi packet detector outputs a terminal detection signal. In the third embodiment, step S6 of determining whether infrared rays are received is omitted from the flowchart of FIG. 3. In step S8, it is determined whether the smartphone 3 is detected by the wireless charger 6, instead of determining whether wireless charging is being performed. If the smartphone 3 is detected, the dimming flag is set to 1. If smartphone 3 is not detected, the dimming flag is set to 0. By using the dimming flag, even when the LED light 5 temporarily emits light with the maximum brightness in response to opening of a door, the LED light 5 emits light corresponding to the dimming flag upon closing of the door.

In the third embodiment, the Qi packet detector analyzes the Qi packet. Alternatively, the Qi packet detector may send information of the Qi packet to the lighting control device 51, and the lighting control device 51 may analyze the Qi packet and detect placement of the smartphone 3.

Fourth Embodiment

A vehicle cabin lighting system according to a fourth embodiment does not use the power detector 52, the wireless power supply detector 53, the Qi packet detector, and so on. A communication state of the smartphone 3 is input directly to the lighting control device 51. The flowchart is the same as that of the third embodiment.

The vehicle cabin lighting system according to the first embodiment can reduce the brightness of reflected light by detecting placement of a mobile terminal using a simple configuration such as by detecting power consumption of a wireless charger. The vehicle cabin lighting system according to the second embodiment can reduce the brightness of reflected light by detecting placement of a mobile terminal through detection of power supply using the wireless power supply detector 53 having a simple configuration. The vehicle cabin lighting system according to the third embodiment can reduce the brightness of reflected light by detecting placement of a mobile terminal using the Qi packet detector. The vehicle cabin lighting system according to the fourth embodiment can reduce the brightness of reflected light by detecting placement of a mobile terminal without using the power detector 52, the wireless power supply detector 53, the Qi packet detector, and so on.

While the embodiments of the disclosure have been described in detail above with reference to the accompanying drawings, specific configurations are not limited to these embodiments and modifications of designs or the like within a scope not departing from the gist of the disclosure are also encompassed by the disclosure. The embodiments described above can be combined together by using the techniques thereof unless any contradiction or issue arises in terms of the object or configuration thereof.

According to the disclosure, a possibility that reflected light, caused as a result of illuminating light emitted from a lighting device being reflected off a display screen of a mobile terminal or the like placed in a placement area, gives a driver a sense of discomfort is reduced.

The lighting control device 51 illustrated in FIGS. 2 and 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the lighting control device 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the lighting control device 51 illustrated in FIGS. 2 to 4.

The invention claimed is:

1. A vehicle cabin lighting system to be applied to a vehicle, the vehicle cabin lighting system comprising:
   a lighting device configured to illuminate a placement area in which an article is to be placed;
   a lighting control device configured to control brightness of the lighting device; and
   a wireless charger configured to charge, in a non-contact manner, a mobile terminal including a display screen placed in the placement area receiving the illumination from the lighting device, wherein
   the lighting control device is configured to execute, in response to detecting that the mobile terminal is placed in the placement area based on an operation of the wireless charger, a control by which the lighting device is turned off or dimmed according to a state of the vehicle including a traveling state of the vehicle and a state of the wireless charging.

2. The vehicle cabin lighting system according to claim 1, wherein the lighting control device is configured to execute the control by which the lighting device is turned off or dimmed based on the wireless charger charging the mobile terminal.

3. The vehicle cabin lighting system according to claim 1, wherein the lighting control device is configured to execute the control by which the lighting device is turned off or dimmed based on the wireless charger communicating with the mobile terminal.

4. The vehicle cabin lighting system according to claim 2, further comprising:
   a vehicle state detector configured to detect a state of the vehicle; and
   a traveling state determiner configured to infer the traveling state of the vehicle, based on the state of the vehicle detected by the vehicle state detector, wherein
   the lighting control device is configured to prohibit, in a case where the traveling state determiner determines that the vehicle is not traveling, executing the control by which the lighting device is turned off or dimmed in response to the detecting of the mobile terminal based on the operation of the wireless charger.

5. The vehicle cabin lighting system according to claim 3, further comprising:
   a vehicle state detector configured to detect a state of the vehicle; and
   a traveling state determiner configured to infer the traveling state of the vehicle, based on the state of the vehicle detected by the vehicle state detector, wherein
   the lighting control device is configured to prohibit, in a case where the traveling state determiner determines that the vehicle is not traveling, executing the control by which the lighting device is turned off or dimmed in response to the detecting of the mobile terminal based on the operation of the wireless charger.

6. The vehicle cabin lighting system according to claim 2, further comprising:
   a shift state detector configured to detect a state of a select lever for transmission, wherein
   in a case where the shift state detector detects that the select lever for transmission is in a parking state, the lighting control device is configured to prohibit executing the control by which the lighting device is turned off or dimmed based on the mobile terminal being charged by the wireless charger.

7. The vehicle cabin lighting system according to claim 3, further comprising:
   a shift state detector configured to detect a state of a select lever for transmission, wherein
   in a case where the shift state detector detects that the select lever for transmission is in a parking state, the lighting control device is configured to prohibit executing the control by which the lighting device is turned off or dimmed based on the mobile terminal being charged by the wireless charger.

8. The vehicle cabin lighting system according to claim 4, further comprising:
   a shift state detector configured to detect a state of a select lever for transmission, wherein
   in a case where the shift state detector detects that the select lever for transmission is in a parking state, the lighting control device is configured to prohibit executing the control by which the lighting device is turned off or dimmed based on the mobile terminal being charged by the wireless charger.

9. The vehicle cabin lighting system according to claim 5, further comprising:
   a shift state detector configured to detect a state of a select lever for transmission, wherein
   in a case where the shift state detector detects that the select lever for transmission is in a parking state, the lighting control device is configured to prohibit executing the control by which the lighting device is turned off or dimmed based on the mobile terminal being charged by the wireless charger.

10. The vehicle cabin lighting system according to claim 2, further comprising:
    a door opening-closing detecting device configured to detect opening and closing of a door, wherein
    in a case where the door opening-closing detecting device detects that any door is open, the lighting control device is configured to prohibit executing the control by which the lighting device is turned off or dimmed based on the mobile terminal being charged by the wireless charger.

11. The vehicle cabin lighting system according to claim 3, further comprising:

a door opening-closing detecting device configured to detect opening and closing of a door, wherein in a case where the door opening-closing detecting device detects that any door is open, the lighting control device is configured to prohibit executing the control by which the lighting device is turned off or dimmed based on the mobile terminal being charged by the wireless charger.

12. The vehicle cabin lighting system according to claim 4, further comprising:
a door opening-closing detecting device configured to detect opening and closing of a door, wherein in a case where the door opening-closing detecting device detects that any door is open, the lighting control device is configured to prohibit executing the control by which the lighting device is turned off or dimmed based on the mobile terminal being charged by the wireless charger.

13. The vehicle cabin lighting system according to claim 5, further comprising:
a door opening-closing detecting device configured to detect opening and closing of a door, wherein in a case where the door opening-closing detecting device detects that any door is open, the lighting control device is configured to prohibit executing the control by which the lighting device is turned off or dimmed based on the mobile terminal being charged by the wireless charger.

14. The vehicle cabin lighting system according to claim 1, wherein the lighting control device is configured to execute, in response to detecting that the mobile terminal is placed in the placement area based on the operation of the wireless charger, the control by which the lighting device is turned off or dimmed according to the state of the vehicle and the state of the wireless charging, wherein the lighting control device is configured to control the lighting device according to the state of the vehicle comprising at least one of a movement of the vehicle, opening or closing state of any of door of the vehicle, and a state of headlights of the vehicle.

15. A vehicle cabin lighting system to be applied to a vehicle, the vehicle cabin lighting system comprising:
a lighting device configured to illuminate a placement area in which an article is to be placed;
a lighting control device configured to control brightness of the lighting device;
a wireless charger configured to charge, in a non-contact manner, a mobile terminal placed in the placement area, wherein the lighting control device is configured to execute, in response to detecting that the mobile terminal is placed in the placement area based on an operation of the wireless charger, a control by which the lighting device is turned off or dimmed;
a vehicle state detector configured to detect a state of the vehicle; and
a traveling state determiner configured to infer a traveling state of the vehicle, based on the state of the vehicle detected by the vehicle state detector, wherein
the lighting control device is configured to prohibit, in a case where the traveling state determiner determines that the vehicle is not traveling, executing the control by which the lighting device is turned off or dimmed in response to the detecting of the mobile terminal based on the operation of the wireless charger.

16. The vehicle cabin lighting system according to claim 15, further comprising:
a shift state detector configured to detect a state of a select lever for transmission, wherein in a case where the shift state detector detects that the select lever for transmission is in a parking state, the lighting control device is configured to prohibit executing the control by which the lighting device is turned off or dimmed based on the mobile terminal being charged by the wireless charger.

17. The vehicle cabin lighting system according to claim 15, further comprising:
a door opening-closing detecting device configured to detect opening and closing of a door, wherein in a case where the door opening-closing detecting device detects that any door is open, the lighting control device is configured to prohibit executing the control by which the lighting device is turned off or dimmed based on the mobile terminal being charged by the wireless charger.

18. A vehicle cabin lighting system to be applied to a vehicle, the vehicle cabin lighting system comprising:
a lighting device including a light source and configured to illuminate a placement area in which an article is to be placed;
circuitry configured to control brightness of the lighting device; and
a wireless charger configured to charge, in a non-contact manner, a mobile terminal including a display screen placed in the placement area receiving the illumination from the lighting device, wherein
the circuitry is configured to execute, in response to detecting that the mobile terminal is placed in the placement area based on an operation of the wireless charger, a control by which the lighting device is turned off or dimmed or increased in intensity according to a state of the vehicle including a traveling state of the vehicle and a state of charging of the mobile terminal by the wireless charger.

19. The vehicle cabin lighting system according to claim 18, further comprising a vehicle state detector configured to detect a state of the vehicle; and
a traveling state determiner configured to infer a traveling state of the vehicle, based on the state of the vehicle detected by the vehicle state detector, wherein
the circuitry is configured to prohibit, in a case where the traveling state determiner determines that the vehicle is not traveling, executing the control by which the lighting device is turned off or dimmed in response to the detecting of the mobile terminal based on the operation of the wireless charger.

20. The vehicle cabin lighting system according to claim 18, further comprising:
a shift state detector configured to detect a state of a select lever for transmission, wherein in a case where the shift state detector detects that the select lever for transmission is in a parking state, the circuitry is configured to prohibit executing the control by which the lighting device is turned off or dimmed based on the mobile terminal being charged by the wireless charger.

* * * * *